Feb. 8, 1949.    M. W. HUBER    2,461,279
HYDRAULIC CIRCUIT
Filed April 1, 1946
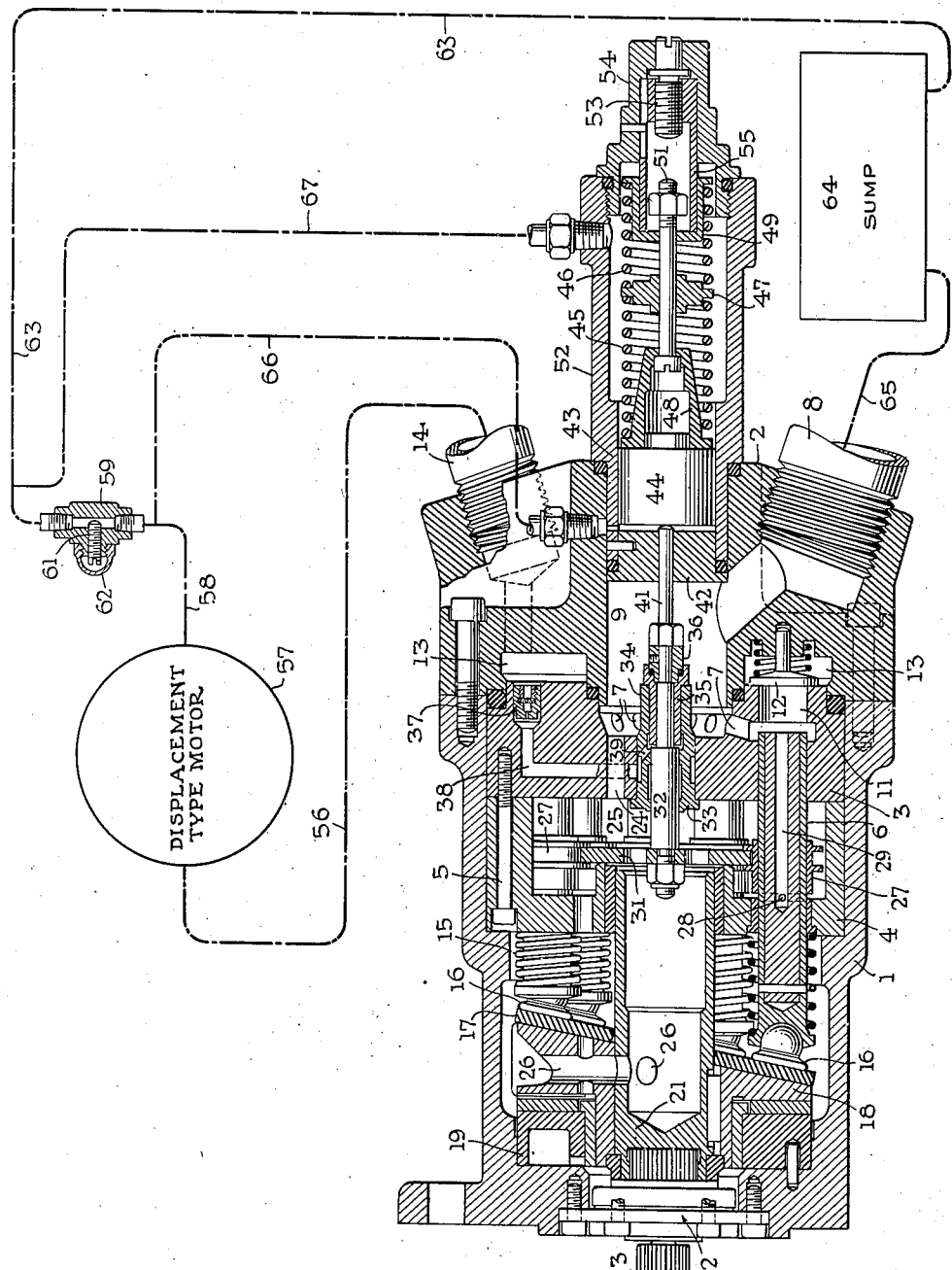
INVENTOR.
Matthew W. Huber
BY
Attorneys Patented Feb. 8, 1949

2,461,279

UNITED STATES PATENT OFFICE 2,461,279

HYDRAULIC CIRCUIT

Matthew W. Huber, Watertown, N. Y., assignor to The New York Air Brake Company, a corporation of New Jersey Application April 1, 1946, Serial No. 658,590

3 Claims. (Cl. 60—53)

This invention relates to hydraulic power transmission circuits, and provides means for operating a displacement motor at approximately constant speed, by controlling the displacement of a variable displacement pump.

The invention was developed for use in aircraft and will be described as used in that environment, but without implying that the invention is limited to the particular field of use. All or some of its advantages can be secured in other applications of the inventive concept.

On an aircraft, a pump which furnishes hydraulic liquid under pressure for operating secondary apparatus is customarily driven directly by one of the propelling engines. As a consequence it must run continuously while the plane is in flight, and at speeds determined by engine speeds usually unrelated to the demand for hydraulic fluid.

To meet these conditions applicant has developed a constant stroke variable displacement pump in which the displacement of the pump is varied from approximately zero to the maximum of which it is capable by rendering a varying portion of the stroke ineffective. The pump displacement is varied in response to changes in the pressure against which its discharge occurs, the displacement diminishing as discharge pressure increases above a chosen value. This type of control is efficient, and imposes very little load on the controlling mechanism. The improved pump is described and claimed in prior application Serial No. 626,690, filed November 5, 1945, now Patent No. 2,433,222, issued December 23, 1947, and in application Serial No. 757,621, filed June 27, 1947.

Sometimes it is necessary to operate a displacement motor by hydraulic liquid delivered by an engine driven pump and to limit the speed reached by the motor. The present invention attains the result by putting the motor in circuit with a variable displacement pump and subjecting the displacement control mechanism of the pump to a secondary (modifying) control which responds to motor speeds, as indicated by the rate at which hydraulic liquid is discharged by the motor.

There are two possibilities. If the purpose is merely to limit but not closely control the speed of the hydraulic motor, a relatively small capacity pump is used, i. e., one which at the maximum speed at which it is driven will furnish slightly more than the output required to drive the motor at the chosen limiting speed.

If the purpose is to maintain motor speed constant over a considerable range of pump speeds, a larger pump must be used so that it may operate at part capacity and still assure operation of the motor at the desired maintained speed. Then, as pump speed varies pump capacity will be reversely varied to hold the volumetric output constant. As a consequence, motor speed is constant.

A preferred embodiment using the pump disclosed in said prior applications will now be described. In its broad aspects any controllable variable capacity pump might be used, but more efficient performance and closer regulation are afforded by the type of pump illustrated because the control mechanism is sensitive and imposes only a light load on the controller, and because the type of regulation does not entail serious energy losses.

In the drawings the pump is shown in axial section in order to illustrate how the secondary control is applied. The adjustable restricting valve is also shown in section, but the balance of the circuit is illustrated in diagram since the components are conventional.

The pump body 1 has a cap 2 within which are clamped the cylinder assembly comprising an annular cylinder block 3 and an annular guide block 4 held together by screws 5. The blocks 3 and 4 are bored to receive and guide nine parallel pump plungers 6 which are arranged in circular series. The ends of these plungers expose inlet ports 7 when the plungers are retracted. The ports 7 are supplied with hydraulic liquid entering connection 8 and flowing to central chamber 9 from which the ports 7 lead.

When projected to the right the plungers close ports 7 and force liquid through cylinders 11 past the spring loaded discharge valves 12 into annular discharge passage 13 and thence to discharge connection 14.

The plungers are each retracted by a corresponding spring 15 and each has a universally tilting head 16. The heads 16 engage a creep plate 17 which is seated on a swash plate 18. This is sustained by a thrust bearing generally indicated at 19 and is turned by a shaft 21. The assembly 22 is an oil seal for the shaft, and the splined part 23 is the driving connection for shaft 21.

A passage 24 leads from inlet chamber 9 to spill-back chamber 25 enclosed by blocks 4 and 5, but formed in block 4. The chamber 25 is therefore filled with hydraulic liquid (oil). The shaft 21 is counterbored from its right end which turns in block 4 and is exposed in chamber 25, and hence receives oil from chamber 25 and supplies it through radial ports 26 to the space in which the plunger-heads, swash plate and creep plate work. Hench, all parts run in oil.

Within chamber 25 each plunger 6 is encircled by a flanged, sleeve-like spill-back valve 27. Each such valve controls radial ports 28 in its plunger, and these radial ports lead from an axial port 29 bored from the end of the plunger. All the valves 27 are adjusted in unison by a plate 31 fixed on a stem 32 and engaging between flanges on valves 27.

When stem 32 is in its left-most position, as shown in the drawing, ports 28 are closed by the initial displacing movements of plungers 6. If the stem 32 is displaced to the right the spill-back ports are closed later in the displacing strokes of the plungers. They are not closed at all in the extreme right hand position of the stem 32.

Stem 32 is guided in a bushing 33 pressed into a central aperture in cylinder block 3, and the bushing 33 is formed at its right hand end with a small cylinder 34 in which a piston 35 works. Piston 35 is held on a reduced portion of stem 32 by a collar 36, and over a small annular area is subject to the head pressure developed by the pump. Pressure fluid reaches the piston from chamber 13 through a combined strainer and choke 37 and ports 38, 39.

As so far described the pump is essentially identical with that shown in Patent No. 2,433,222.

Instead of a simple spring resisting the thrust of pressure fluid to the right on piston 35, the stem 32 has a projecting end 41 which is slidable through a guide in cylinder head 42 of a cylinder 43, and engages a double acting piston 44 mounted in cylinder 43. The piston 44 is biased inward (to the left) by coil compression springs 45, 46. These, for convenience in mounting, are assembled with a center guide 47, two spring seats 48, 49 and a bolt 51 which holds the springs under partial compression when removed from the housing 52 in which they are enclosed. Spring seat 49 is adjustable to vary the spring loading by means of a screw 53 swiveled in cap 54 and threaded in a splined sleeve 55 which engages the spring seat.

As indicated in diagram, connection 14 is connected by line 56 with the supply connection of a displacement motor 57. By displacement motor is meant any motor whose speed is directly proportional to the volume of liquid passing through it. It could be an expansible chamber motor of either a rotary or reciprocating type, but if reciprocating, a multicylinder unit is advisable.

From the discharge connection of the motor a line 58 leads to a throttling unit 59 comprising a ported body having a flow throttling screw 61 locked in adjusted position by an acorn nut 62.

From the throttling unit 59 line 63 leads to sump 64, and from sump 64 suction line 65 leads to pump inlet connection 8.

The piston 44 is biased outward (to the right) by a pressure differential equal to the pressure drop through throttling unit 59. To effect this result the space to the left of piston 44 is connected by branch line 66 with line 58 close to fitting 59, and the space to the right of piston 44 is connected by branch line 67 with line 63 close to fitting 59.

Branch line 67 is not always strictly necessary, but is desirable as a safeguard against disturbing effects of back pressure in line 63, or changes of absolute pressure in sump 64. Such changes must be foreseen in airplane installations.

*Operation*

Primary control is effected by head pressure acting to the right on piston 35 against the urge of springs 45, 46. If the motor tends to run too fast piston 44 is urged to the right by pressure developed in line 66 by the increased back pressure developed by fitting 59. This is effective to reduce pump displacement and thus reduce the speed of the motor.

In one installation in which it was desired to limit motor speed to 2400 R. P. M. the primary adjustment of a pump proportioned as illustrated was set to maintain a discharge pressure of 1700 p. s. i. and the fitting 59 was adjusted for a pressure drop of only 50 p. s. i. across the fitting.

It it is desired to hold the motor speed constant over a wide range of pump speeds, the pump should rate a considerable excess capacity when operating at top speed and full displacement. Even so, the pressure drop through fitting 59 may still be small.

Excess pump capacity is not needed if the motor sped need be limited only near top pump speed.

As stated, the principle can be applied by the use of other variable capacity pumps, but the pump chosen for illustration has the advantages of sensitive control and high efficiency. Sensitive control permits the use of a low pressure drop at fitting 59 and consequently saves energy.

In the accompanying drawing the pump is shown on a scale large enough to permit its construction to be understood. The diagrammatic representation of the motor is made without regard to scale.

In the claims the term "movable abutment" will be used as a generic term to include pistons, diaphragms and like equivalent components. Since only the annular area at the periphery of piston 35 is effective, this piston has a very small effective area on which the relatively high discharge pressure developed by the pump acts. Piston 44, however, is relatively large. It has many times the effective area of piston 35, so that it exerts a significant, but secondary regulatory force when affected by a small back pressure developed in fitting 59.

What is claimed is:

1. A hydraulic unit comprising means for supplying liquid, a pump, a motor and connections such that the pump draws liquid from the liquid supplying means and discharges it through the motor; means for restricting the flow of liquid discharging from the motor; adjustable means for progressively varying the effective displacement of the pump; yielding means biasing said adjustable means in a direction to cause the pump to operate at full displacement; and two pressure responsive means arranged to react on said adjustable means in opposition to said bias the first of which responds to fluid pressure in the connection between the pump and motor and the second of which responds to the back pressure developed by said flow restricting means.

2. A hydraulic unit comprising means for supplying liquid, a pump, a motor and connections such that the pump draws liquid from the liquid supplying means and discharges it through the motor; means for restricting the flow of liquid discharging from the motor; adjustable means for progressively varying the effective displacement of the pump; yielding means biasing said adjustable means in a direction to cause the pump to operate at full displacement; and two pressure responsive means arranged to react on said adjustable means in opposition to said bias the first of which is a movable abutment of small effective area, subject to fluid pressure in the connection between the pump and motor and the second of which is a much larger movable abutment subject to the back pressure developed by said flow restricting means.

3. A hydraulic unit comprising means for supplying liquid, a pump, a motor and connections such that the pump draws liquid from the liquid supplying means and discharges it through the motor; means for restricting the flow of liquid discharging from the motor; adjustable means for progressively varying the effective displacement of the pump; yielding means biasing said adjustable means in a direction to cause the pump to operate at full displacement; and two pressure responsive means arranged to react on said adjustable means in opposition to said bias the first of which is a movable abutment of small effective area, subject to fluid pressure in the connection between the pump and motor, and the second of which is a much larger double acting movable abutment subject in opposite directions to the pressures of liquid approaching and leaving said flow restricting means.

MATTHEW W. HUBER.

REFERENCES CITED

The following references are of record in the file of this patent:

UNITED STATES PATENTS

| Number | Name | Date |
| --- | --- | --- |
| 2,087,772 | Kempthorne | July 20, 1937 |
| 2,238,061 | Kendrick | Apr. 15, 1941 |
| 2,388,462 | Beeh | Nov. 6, 1945 |
| 2,393,544 | Lum | Jan. 22, 1946 |